United States Patent [19]

Battaglia

[11] Patent Number: 4,822,661
[45] Date of Patent: Apr. 18, 1989

[54] LIGHTWEIGHT STONE FURNITURE

[76] Inventor: Gino C. Battaglia, 25022 Vermont Ave., Harbor City, Calif. 90710

[21] Appl. No.: 75,093

[22] Filed: Jul. 20, 1987

[51] Int. Cl.⁴ ............................................. B32B 3/12
[52] U.S. Cl. .................................... 428/116; 52/612; 52/806; 108/161; 125/1; 156/254; 156/267; 156/292; 428/15
[58] Field of Search ......................... 52/806, 612, 806; 428/73, 116, 117, 118; 108/161; 156/254, 267, 292; 297/463; 125/1

[56] References Cited

U.S. PATENT DOCUMENTS

| | | | |
|---|---|---|---|
| 3,723,233 | 3/1973 | Bourke | 52/806 X |
| 3,878,030 | 4/1975 | Cook | 428/49 X |
| 3,886,927 | 6/1975 | Chattin | 125/23 C |
| 3,931,772 | 1/1976 | Puccio et al. | 108/161 |
| 3,950,202 | 4/1976 | Hodges | 428/116 X |
| 3,963,846 | 6/1976 | Bourke | 428/116 X |
| 4,177,789 | 12/1979 | Marocco | 125/1 |
| 4,601,147 | 7/1986 | Migliore | 52/612 X |
| 4,624,815 | 11/1986 | Moufarrege | 428/49 X |
| 4,640,850 | 2/1987 | Marocco | 52/612 X |
| 4,660,539 | 4/1987 | Battaglia | 125/10 |

Primary Examiner—Henry F. Epstein
Attorney, Agent, or Firm—Charles H. Thomas

[57] ABSTRACT

Furniture having genuine stone surfaces is formed of panels of flat slabs of stone bonded by adhesive to underlying supports coextensive with the slabs of stone. The slabs of stone are cut concurrently from a block of stone by means of a gang-saw. Each slab of stone is no greater than about one centimeter in thickness. Articles of furniture constructed of panels with the stone surfaces are comparable in weight and cost to articles of furniture constructed of solid wood, and have surfaces of genuine stone.

15 Claims, 2 Drawing Sheets

LIGHTWEIGHT STONE FURNITURE

BACKGROUND OF THE INVENTION

The present invention relates to lightweight furniture having genuine stone surfaces and a method of manufacturing such furniture.

DESCRIPTION OF THE PRIOR ART

At present paneling having a surface of stone, such as marble or granite, is manufactured for special purpose uses such as wall and counter panels. While solid stone slabs may be used to create such panels, the slabs of solid stone must be manufactured with relatively great thicknesses. If the solid stone slabs are cut too thin they frequently break. When the solid stone slabs are manufactured with a thickness sufficient to avoid a significant likelihood of breaking, the resulting panels are extremely heavy and difficult to install. Consequently, alternatives have been sought to provide panels having genuine stone surfaces, but without the excessively great weight of solid stone panels.

In one manufacturing technique panels are produced which have stone surfaces backed by an underlying support which may, for example, be formed of an aluminum honeycomb structure. According to this conventional technique a slab of stone is cut approximately two centimeters in thickness. Such a thickness is sufficient to prevent the slab from breaking, but the weight of the slab is excessively great. A backing formed of aluminum webbing or partitions defining cavities in a honeycomb pattern of hexagonal prisms is then secured by adhesive to both sides of the relatively thick, stone slab. The hexagonal aluminum prisms are oriented perpendicular to the plane of the slab. The slab is then cut lengthwise between its outer, bonded surfaces to divide the initial structure into two separate panels. Each panel is formed of a marble slab, one centimeter in thickness, to one side of which the underlying aluminum, honeycomb support is bonded by an epoxy adhesive. The exposed stone surfaces of the slabs are then polished. The underlying support of each panel prevents the stone slab from breaking.

The conventional technique of producing stone slabs with underlying, supporting backings is extremely expensive. To cut one four foot by eight foot sheet of granite according to the conventional manufacturing technique requires approximately eight hours of work. Consequently, only ten such panels can be produced in a normal work week by a single individual. Since marble is not as hard as granite, the division of a sheet of marble takes approximately one third the time that is required to cut a sheet of granite of the same size. Nevertheless, the cutting process necessary to divide the stone slab in half with the conventional manufacturing technique is still extremely time consuming. Consequently, panels having stone surfaces with underlying backings produced in accordance with the conventional manufacturing technique are extremely expensive. The very considerable expensive manufacture of such slabs limits their use to wall panels, elevator panels, and the like.

SUMMARY OF THE INVENTION

The present invention involves a new and improved technique for manufacturing panels having genuine stone surfaces. According to the technique of the invention a large block of stone is cut using a gang-saw having a plurality of blades to produce a multiplicity of stone slabs concurrently. The gang-saw allows a far greater number of stone slabs to be produced within a given period of time as contrasted with the conventional technique of first bonding both exposed surfaces of a stone slab to supporting structures and then bifurcating the stone slab. According to the technique of the invention one hundred fifty sheets of granite can be cut by a single laborer in one week. Thus, composite stone surfaced panels can be produced at a rate fifteen times the rate possible with the conventional manufacturing technique. The expense of producing stone surfaced panels according to the invention is thus greatly reduced as contrasted with the prior manufacturing technique.

Due to the greatly reduced expense of producing panels having stone surfaces mounted on underlying supports in accordance with the invention, it has been possible to create articles of furniture having genuine stone surfaces which may be sold in competition with comparable furniture constructed of wood. While the cost of such furniture having genuine stone surfaces is somewhat greater than the cost of a comparable article manufactured of wood, the cost differential is small enough so that furniture with stone surfaces, manufactured according to the invention, can be successfully sold in competition with wooden furniture. Moreover, the stone surfaces of furniture manufactured according to the invention are generally considered to be far more luxurious and attractive than the wooden surfaces of conventional articles of furniture manufactured of wood. Thus, the manufacturing technique of the invention allows stone panels to be used in furniture construction where such a use has heretofore been totally impractical on a commercially feasible basis.

One purpose of the present invention is to provide paneling for surfaces of furniture having the beauty that only genuine stone can provide, and without the inordinately large cost which would result if stone surfaced paneling produced according to the conventional technique were utilized.

Another purpose of the invention is to provide articles of furniture which are surfaced with genuine stone, such as marble. Such furniture is more luxurious and attractive than wooden furniture. Because the paneling employed utilizes only a very thin layer of stone, the weight of articles of furniture manufactured from such paneling is comparable to the weight of solid wooden furniture.

According to the invention panels having stone surfaces are provided which each include a thin layer of stone backed by a sheet of lightweight backing material, for example, an aluminum honeycomb backing. In the case of marble the thickness of the marble layer may range from one centimeter down to one half of one centimeter, or even thinner. The marble layer and the backing are bonded together by an epoxy adhesive, and the resultant panels are employed in furniture construction.

The method of manufacturing lightweight furniture panels having stone surfaces according to the invention is extremely important, as the stone layer will crack if manufacturing is not performed correctly. According to the invention the panels are manufactured by cutting a plurality of stone slabs no greater than about one centimeter in thickness from a block of stone using a gang-saw having multiple blades. Slabs equal in quantity to one more than the number of blades are thereby produced concurrently. One surface of each of the slabs of stone is then bonded throughout to an underlying support using an adhesive to thereby form panels with bonded and exposed stone surfaces. The adhesive is cured and the exposed surface of each of the stone slabs of each panel is then milled while mounted on its underlying support. Milling is carried out to bring the stone slab of each panel down to a predetermined desired thickness. The exposed surface of each of the supported slabs is then polished. Edges of the panels are beveled by mitering beneath the stone surfaces, so that exposed stone surfaces of adjacent panels meet along linear interfaces, thereby concealing the underlying supports. The panels are then incorporated into articles of furniture as structural elements.

In one broad aspect the present invention may be considered to be an article of furniture including structural members comprised of flat slabs of stone each no greater than about one centimeter in thickness and bonded by adhesive to underlying supports which are coextensive with the slabs of stone. The slabs of stone may be marble, granite, onyx or any other type of stone which provides a durable surface and an asethetically pleasing appearance.

In another broad aspect the invention may be considered to be an improvement in a method of manufacturing furniture. According to the improvement of the invention at least some of the structure of the furniture is fashioned from panels, each of which is formed of a flat slab of stone no greater than about one centimeter thick bonded by adhesive to an underlying support which is coextensive with the slab of stone.

Each panel is manufactured by concurrently cutting a plurality of parallel stone slabs no greater than about one centimeter in thickness from a block of stone using a gang-saw with multiple blades. Each of the slabs is bonded throughout to an underlying support using an adhesive. Each panel thus has a bonded and an exposed stone surface. The adhesive is cured and the exposed surface of each of the stone slabs of each panel is milled on the underlying support down to a predetermined thickness. The exposed surfaces of the supported stone slabs are then polished. Edges of the slabs and the underlying supports are then beveled inwardly so that the exposed stone surfaces of adjacent panels meet along linear interfaces, thereby concealing the underlying supports. For example, where the adjacent panels are perpendicular to each other, the abutting edges are beveled at an angle of forty five degrees. The underlying supports are thereby concealed so that only the exposed stone surfaces of the panels are visible. The panels are then incorporated into articles of furniture as structural elements.

The invention may be described with greater clarity and particularity by reference to the accompanying drawings.

DESCRIPTION OF THE EMBODIMENT AND IMPLEMENTATION OF THE METHOD

Figure 1:
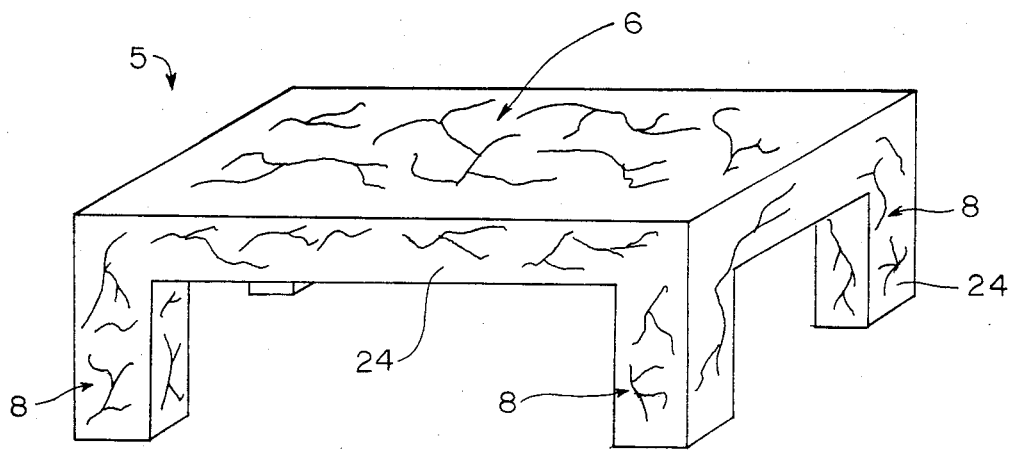
FIG. 1 is a perspective view of an article of furniture constructed according to the invention.

FIG. 1 illustrates an article of furniture which is a coffee table manufactured according to the invention. The table 5 includes structural members, such as the table top 6, and the table legs 8, which are each manufactured of panels 24 in accordance with the invention.

Figure 2:
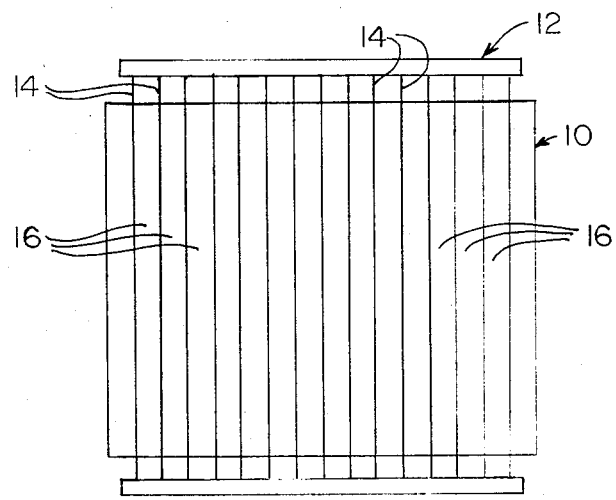
FIG. 2 is a diagramatic drawing showing the use of a gang-saw to cut a marble block into slabs according to the method of the invention.

To manufacture the panels 24, a block 10 of stone, such as marble, is first cut by a gang-saw 12 having a plurality of blades 14, as depicted in FIG. 2. The blades 14 cut the block 10 of marble into flat, separate slabs 16. Each of the slabs 16 may be one centimeter in thickness.

Each slab 16 is then bonded with a conventional epoxy adhesive to a backing sheet 18 which may, for example, by formed of aluminum webbing or partitions 20 about three quarters of one inch in thickness and oriented perpendicular to the sheet 16. The partitions 20 of the backing 18 form a honeycomb pattern of hexagonal prisms oriented perpendicular to the plane of the slabs 16. The bonding layer of epoxy adhesive is indicated at 22 in FIG. 2.

Figure 4:
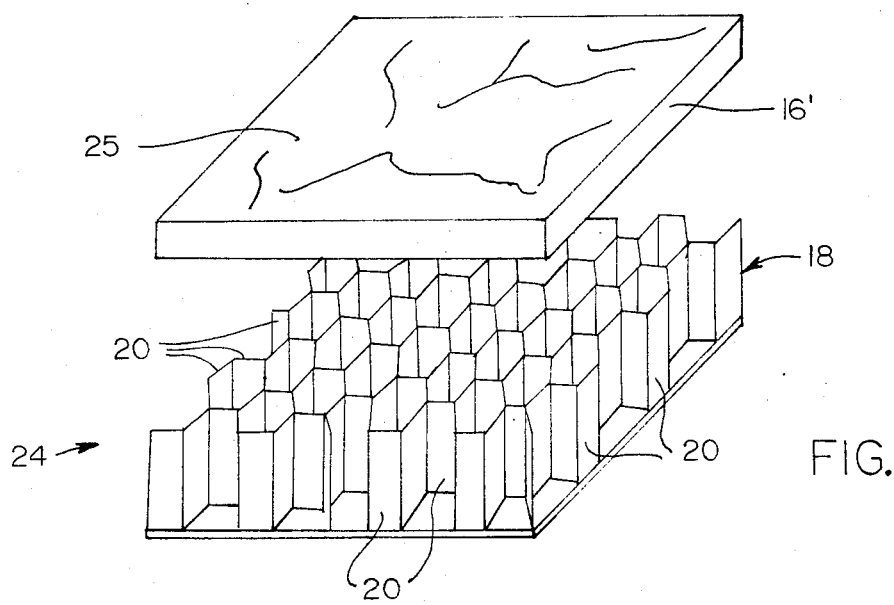
FIG. 4 is an exploded perspective view of the panel of FIG. 2.
Figure 3:
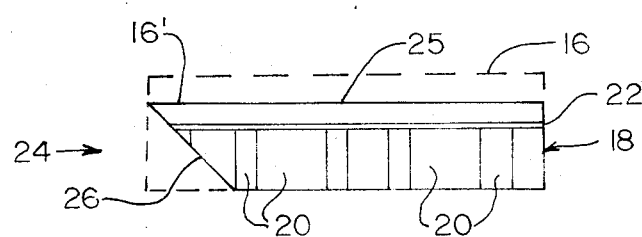
FIG. 3 is an edge view of a section of paneling produced for incorporation into the article of furniture of FIG. 1.

Once the epoxy layer 22 has cured, the bonded slab 16 and backing sheet 18 are passed through a milling machine to mill the marble slabs 16 down to a desired thickness, which may be 0.05 centimeters, for example. The milled slab 16' is indicated in FIGS. 3 and 4. Thereafter, the exposed genuine stone surface 25 of the slab 16' opposite the surface bonded by the epoxy layer 22 is polished. The composite structure 24 which is produced is a panel comprised of a flat slab 16' of marble no greater than about one centimeter thick bonded by adhesive 22 to an underlying support 18 which is coextensive with the stone slab 16'. Although marble slabs of a thickness comparable to the slab 16' would be likely to crack if utilized in unsupported sheet form, cracking of the slab 16' is prevented by the backing support 18 which is bonded thereto. Where edges of the panels 24 in the table 5 are to meet at angles relative to each other, the panel edges are beveled beneath the exposed stone surface 25, as indicated at 26 in FIG. 3. The underlying support is thereby concealed and the exposed stone surfaces 25 of abutting panels 24 meet at straight, linear interfaces.

It is to be understood that numerous different articles of furniture may be produced in addition to the table 5 depicted in FIG. 1. For example, dining tables, conference tables, benches, corner pedestals, desks, sink cabinets and other articles of furniture may be produced with polished genuine stone exterior surfaces. The table 5, like the other articles of furniture which may be produced according to the invention, is comparable in weight to an article of furniture of the same size constructed of solid wood. Nevertheless, the table 5 has all of the beauty and durability of solid stone.

It should also be understood that the invention contemplates the use of other stone materials in addition to marble. For example, comparable panels 24 used in the furniture construction depicted may be formed of granite, onyx or any other hard, durable stone substance. Accordingly, the scope of the invention should not be constructed as limited to the specific embodiment and the manner of implementation of the method depicted and described herein, but rather is defined in the claims appended hereto.

I claim:

1. An article of furniture including a plurality of structural members comprised of flat slabs of stone each no greater than about one centimeter thick and each having an exposed surface and a concealed surface, and said concealed surfaces of said flat slabs of stone are bonded by adhesive to underlying supports, and at least some of said structural members meet with abutting edges at angles relative to each other, and said abutting edges which meet at angles are beveled beneath said exposed surfaces to thereby conceal said underlying supports and form straight, linear interfaces.

2. An article of furniture according to claim 1 wherein said slabs of stone are marble.

3. An article of furniture according to the claim 2 wherein each support is comprised of a plurality of aluminum partitions all oriented perpendicular to said slabs and arranged to form a honeycomb pattern of cavities.

4. In a method of manufacturing furniture the improvement comprising fashioning at least some of the structure of said furniture from panels each of which is formed of a flat slab of stone no greater than about one centimeter thick bonded by adhesive to an underlying support which is coextensive with said slab of stone, the steps comprising;

concurrently cutting a plurality of parallel stone slabs no greater than about one centimeter in thickness from a block of stone by passing said block of stone through a gang-saw a single time so that each slab has a pair of opposite parallel surfaces after passing through said gang-saw, bonding a single one of said surfaces of each of said slabs throughout to an underlying support comprised of a plurality of aluminum partitions all oriented perpendicular to said slab and arranged to form a honeycomb pattern of cavities using an adhesive to form panels each having a bonded and an exposed stone surface, curing said adhesive, milling said exposed surface of each of said stone slabs of each panel on its support down to a predetermined thickness, polishing the exposed surfaces of said supported slabs of said panels, and incorporating said panels into articles of furniture as structural elements so as to conceal each of said underlying supports from view.

5. A method according to claim 4 wherein said slab is granite.

6. A method according to claim 4 wherein said slab is marble.

7. In a method of constructing furniture the improvement comprising:

concurrently cutting a plurality of parallel stone slabs no greater than about one centimeter in thickness from a block of stone by passing said block of stone through a gang-saw a single time so that each slab has a pair of opposite parallel surfaces after passing through said gang-saw, bonding a single one of said surfaces of each of said slabs throughout to an underlying support using an adhesive to form panels each having a bonded and an exposed stone surface, curing said adhesive, milling said exposed surface of each of said stone slabs of each panel on its support down to a predetermined thickness, polishing the exposed surfaces of said supported slabs of said panels, and incorporating said panels into articles of furniture as structural elements.

8. A method according to Claim 7 herein said block of stone is marble and each underlying support is constructed of a plurality of partitions oriented perpendicular to said stone slabs and forming a honeycomb of cavities laterally bounded by said partitions.

9. A method according to Claim 8 herein said step of milling reduces the thicknesses of said stone slabs to no greater than about one half of one centimeter.

10. A method according to Claim 9 in which bonding is performed with an epoxy adhesive.

11. A method of constructing panels having stone slabs no greater than about one centimeter in thickness from a block of stone by passing said block of stone through a gang-saw a single time so that each slab has a pair of opposite parallel surfaces after passing through said gang-saw, bonding only a first surface in each pair of surfaces of each of said slabs throughout to an underlying support using an adhesive, curing said adhesive, milling a second surface in each pair of surfaces of each of said stone slabs on its support down to a desired thickness, and polishing said second surface of each of said supported slabs.

12. A method according to claim 11 wherein said stone slabs are marble.

13. A method according to claim 12 wherein each underlying support is constructed of a plurality of partitions oriented perpendicular to said stone slabs and forming a honeycomb of cavities laterally bounded by said partitions.

14. A method according to claim 13 wherein said step of milling reduces the thicknesses of said marble slabs to no greater than about one-half of one centimeter.

15. A method according to claim 14 in which bonding is performed with an epoxy adhesive.

* * * * *